US012645209B2

(12) United States Patent
Kunde et al.

(10) Patent No.: US 12,645,209 B2
(45) Date of Patent: Jun. 2, 2026

(54) METHOD AND SYSTEM FOR ACCELERATING SELF-LEARNING USING META LEARNING IN INDUSTRIAL PROCESS DOMAIN

(71) Applicant: Tata Consultancy Services Limited, Mumbai (IN)

(72) Inventors: Shruti Kunal Kunde, Thane West (IN); Amey Sanjaykumar Pandit, Thane West (IN); Rekha Singhal, Thane West (IN); Sharod Roy Choudhury, Thane West (IN)

(73) Assignee: Tata Consultancy Services Limited, Mumbai (IN)

( * ) Notice: Subject to any disclaimer, the term of this patent is extended or adjusted under 35 U.S.C. 154(b) by 666 days.

(21) Appl. No.: 18/168,227

(22) Filed: Feb. 13, 2023

(65) Prior Publication Data

US 2023/0305544 A1 Sep. 28, 2023

(30) Foreign Application Priority Data

Mar. 23, 2022 (IN) .............................. 202221016246

(51) Int. Cl.
G05B 19/418 (2006.01)
(52) U.S. Cl.
CPC ... G05B 19/41885 (2013.01); G05B 19/4183 (2013.01)
(58) Field of Classification Search
USPC ........................................................ 700/29
See application file for complete search history.

(56) References Cited

U.S. PATENT DOCUMENTS

2019/0095756 A1 3/2019 Agrawal et al.
2020/0327448 A1* 10/2020 Yakovlev ............... G06N 3/048
(Continued)

OTHER PUBLICATIONS

Mu, Tianyu, et al., "Assassin: an Automatic claSSificAtion system based on algorithm SelectIoN", Computer Science, Date: Jul. 2021, Publisher: vldb, http://vldb.org/pvidb/vol14/02751-wang.pdf.
(Continued)

*Primary Examiner* — Hien D Khuu
(74) *Attorney, Agent, or Firm* — Finnegan, Henderson, Farabow, Garrett & Dunner, LLP

(57) ABSTRACT

Large training times incurred during the process of self-learning of ML models in digital twins are debilitating and can adversely affect the functioning of industrial plants. Embodiments of the present disclosure provide a method and system for accelerated self-learning using application agnostic meta learner trained using optimal set of meta features selected from classification meta features, regression meta features, and domain meta features based on a domain-meta-feature-taxonomy created for a plurality of industrial plants across a plurality of domains. Optimal feature selection is enabled using ML, DL that provides static feature selection, while Q-learning based approach is disclosed that enables dynamic feature selection. Q-learning based approach has two implementations, static and dynamic reward. In the dynamic reward based approach the reward of choosing an action depends on current state (selected meta features), and reward for selecting the next meta feature, depends on the meta features that have already been selected.

20 Claims, 13 Drawing Sheets

(56) References Cited

U.S. PATENT DOCUMENTS

| | | | | |
|---|---|---|---|---|
| 2020/0410001 A1* | 12/2020 | Sarkissian | ............. | G06F 3/0482 |
| 2022/0051049 A1* | 2/2022 | Wang | ................... | G06N 3/0464 |

OTHER PUBLICATIONS

Lorena, Ana C., "Data complexity meta-features for regression problems", Computer Science, Date: Dec. 2017, Publisher: Springer, https://link.springer.com/content/pdf/10.1007/s10994-017-5681-1. pdf.

Aguiar, Gabriel J. et al., "Towards meta-learning for multi-target regression problems", Machine Learning, Date: Jul. 2019, Publisher: Arxiv, https://arxiv.org/pdf/1907.11277.pdf.

Zhang, Jianyu et al., "Cross-data Automatic Feature Engineering via Meta-learning and Reinforcement Learning", Asia Conference on Knowledge Discovery and Data Mining, Date: Apr. 2020, pp. 818-829, Publisher: Springer, https://link.springer.com/content/pdf/10.1007/978-3-030-47426-3 63.pdf.

* cited by examiner

300 training a meta learner for recommending an optimal regression algorithm during self-learning of a ML regression model of an industrial process, the training comprising — 302 preprocessing, using an incremental data preprocessing approach, each data set from among a plurality of data sets received from a plurality of sensors monitoring the industrial process, the data set comprising a combination of meta data representing old data and new data, — 302a extracting a plurality of meta features from each preprocessed data set, the plurality meta features comprising a) classification meta features, b) regression meta features, and c) domain meta features based on a domain-meta-feature- taxonomy created for a plurality of industrial plants across a plurality of domains — 302b selecting an optimal set of meta features from among the plurality of meta features by utilizing one of a) a ML or Deep Learning (DL) technique providing static approach for selecting the optimal set of features, and b) a Q-learning based technique, utilizing one of (i) a static reward function that remains constant across episodes of Q-learning, and a (ii) a dynamic reward function that changes across episodes — 302c

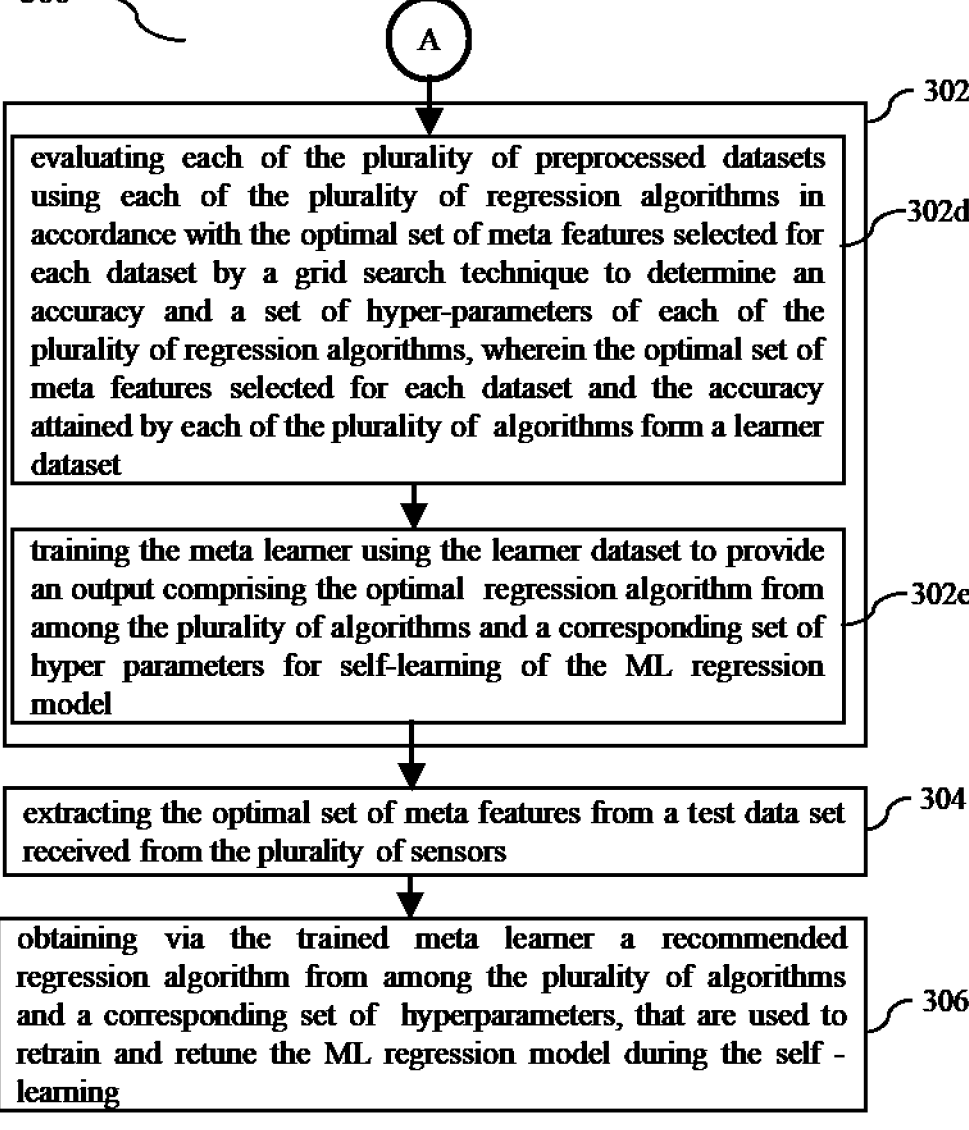

A

302 evaluating each of the plurality of preprocessed datasets using each of the plurality of regression algorithms in accordance with the optimal set of meta features selected for each dataset by a grid search technique to determine an accuracy and a set of hyper-parameters of each of the plurality of regression algorithms, wherein the optimal set of meta features selected for each dataset and the accuracy attained by each of the plurality of algorithms form a learner dataset 302d training the meta learner using the learner dataset to provide an output comprising the optimal regression algorithm from among the plurality of algorithms and a corresponding set of hyper parameters for self-learning of the ML regression model 302e extracting the optimal set of meta features from a test data set received from the plurality of sensors

304 obtaining via the trained meta learner a recommended regression algorithm from among the plurality of algorithms and a corresponding set of hyperparameters, that are used to retrain and retune the ML regression model during the self - learning

Bottleneck Layer

| | Reward (mf1) | Reward (mf2) | Reward (mf3) | Reward (mf4) | Reward (mf5) |
|---|---|---|---|---|---|
| Step 1 | AUC (mf1) | AUC (mf2) | AUC (mf3) | AUC (mf4) | AUC (mf5) |
| Step 2 | AUC (mf3, mf1) | AUC (mf3, mf2) | | AUC (mf3, mf4) | AUC (mf3, mf5) |
| Step 3 | | AUC (mf3, mf2, mf1) | | AUC (mf3, mf4, mf1) | AUC (mf3, mf5, mf1) |
| Step 4 | | AUC (mf3, mf2, mf1, mf5) | | AUC (mf3, mf4, mf1, mf5) | |
| Step 5 | | | | AUC (mf3, mf2, mf1, mf4) | |

FIG. 8B

METHOD AND SYSTEM FOR ACCELERATING SELF-LEARNING USING META LEARNING IN INDUSTRIAL PROCESS DOMAIN

PRIORITY CLAIM

This U.S. patent application claims priority under 35 U.S.C. § 119 to: Indian Patent Application No. 202221016246, filed on 23 Mar. 2022. The entire contents of the aforementioned application are incorporated herein by reference.

TECHNICAL FIELD

The embodiments herein generally relate to self-learning of Machine Learning (ML) models and, more particularly, to a method and system for accelerating self-learning using meta learning in industrial process domain.

BACKGROUND

Digital Twins of industrial process plants are a virtual representation of a physical entity. They enable various what-if and if-what scenarios of the plants' functioning for fault diagnosis and general monitoring in the real-world. They do so through Machine Learning (ML) models built using data from sensors fitted in the plant. Environmental and other factors may cause functioning of equipment in a plant to degrade over time, leading to variation in sensor readings and subsequently affecting quality of ML models' predictions. When the quality drops below a particular threshold, the self-learning loop is triggered, which entails re-tuning/training of the models. Training time drastically increases, when each of these models is trained repetitively using a large number of algorithms to determine the optimal one. The technical challenge lies in the reducing the time spent in self-learning of the models.

SUMMARY

Embodiments of the present disclosure present technological improvements as solutions to one or more of the above-mentioned technical problems recognized by the inventors in conventional systems.

For example, in one embodiment, a method for accelerating self-learning using meta learning in industrial process domain is provided. The method includes training a meta learner for recommending an optimal regression algorithm from among a plurality of regression algorithms during self-learning of a Machine Learning (ML) regression model of an industrial process. The training comprising (A) pre-processing, based on an incremental data preprocessing approach, each data set from among a plurality of data sets corresponding to the ML model to generate a plurality of preprocessed datasets, wherein the received from a plurality of sensors, wherein each data set is a combination of meta data representing old data and new data seamlessly received from a plurality of sensors monitoring the industrial process; (B) extracting a plurality of meta features from each of the plurality of preprocessed data sets, the plurality meta features comprising a) classification meta features, b) regression meta features, and c) domain meta features based on a domain-meta-feature-taxonomy created for a plurality of industrial plants across a plurality of domains; (C) selecting an optimal set of meta features from among the plurality of meta features by utilizing one of a) a ML or Deep Learning (DL) technique providing static approach for selecting the optimal set of features, and b) a Q-learning based technique, utilizing one of (i) a static reward function that remains constant across episodes of Q-learning, and (ii) a dynamic reward function that changes across episodes, wherein a reward for selecting a next meta feature from among the plurality of meta features depends on one or more meta features that have already been selected in the optimal set of meta features, and wherein the selected optimal set maximizes performance of the meta learner measured in terms of an Area Under the Curve (AUC) metric, and wherein the Q-learning based technique; (D) evaluating each of the plurality of pre-processed datasets using each of the plurality of regression algorithms in accordance with the optimal set of meta features selected for each dataset by a grid search technique to determine an accuracy and a set of hyper-parameters of each of the plurality of regression algorithms, wherein the optimal set of meta features selected for each dataset and the accuracy attained by each of the plurality of algorithms form a learner dataset; and (E) training the meta learner using the learner dataset to provide an output comprising the optimal regression algorithm from among the plurality of algorithms and a corresponding set of hyper parameters for self-learning of the ML regression model.

The method further comprises extracting the optimal set of meta features from a test data set received from the plurality of sensors; and obtaining via the trained meta learner a recommended regression algorithm from among the plurality of algorithms and a corresponding set of hyperparameters, that are used to retrain and retune the ML regression model during the self-learning.

In another aspect, a system for accelerating self-learning using meta learning in industrial process domain is provided. The system comprises a memory storing instructions; one or more Input/Output (I/O) interfaces; and one or more hardware processors coupled to the memory via the one or more I/O interfaces, wherein the one or more hardware processors are configured by the instructions to train a meta learner for recommending an optimal regression algorithm from among a plurality of regression algorithms during self-learning of a Machine Learning (ML) regression model of an industrial process. The training comprising (A) pre-processing, based on an incremental data preprocessing approach, each data set from among a plurality of data sets corresponding to the ML model to generate a plurality of preprocessed datasets, wherein the received from a plurality of sensors, wherein each data set is a combination of meta data representing old data and new data seamlessly received from a plurality of sensors monitoring the industrial process; (B) extracting a plurality of meta features from each of the plurality of preprocessed data sets, the plurality meta features comprising a) classification meta features, b) regression meta features, and c) domain meta features based on a domain-meta-feature-taxonomy created for a plurality of industrial plants across a plurality of domains; (C) selecting an optimal set of meta features from among the plurality of meta features by utilizing one of a) a ML or Deep Learning (DL) technique providing static approach for selecting the optimal set of features, and b) a Q-learning based technique, utilizing one of (i) a static reward function that remains constant across episodes of Q-learning, and (ii) a dynamic reward function that changes across episodes, wherein a reward for selecting a next meta feature from among the plurality of meta features depends on one or more meta features that have already been selected in the optimal set of meta features, and wherein the selected optimal set maximizes performance of the meta learner measured in terms of an Area Under the Curve (AUC) metric, and wherein the Q-learning based technique; (D) evaluating each of the plurality of pre-processed datasets using each of the plurality of regression algorithms in accordance with the optimal set of meta features selected for each dataset by a grid search technique to determine an accuracy and a set of hyperparameters of each of the plurality of regression algorithms, wherein the optimal set of meta features selected for each dataset and the accuracy attained by each of the plurality of algorithms form a learner dataset; and (E) training the meta learner using the learner dataset to provide an output comprising the optimal regression algorithm from among the plurality of algorithms and a corresponding set of hyper parameters for self-learning of the ML regression model.

The system further extracts the optimal set of meta features from a test data set received from the plurality of sensors; and obtains via the trained meta learner a recommended regression algorithm from among the plurality of algorithms and a corresponding set of hyperparameters, that are used to retrain and retune the ML regression model during the self-learning.

In yet another aspect, there are provided one or more non-transitory machine-readable information storage mediums comprising one or more instructions, which when executed by one or more hardware processors causes a method for accelerating self-learning using meta learning in industrial process domain. The method includes training a meta learner for recommending an optimal regression algorithm from among a plurality of regression algorithms during self-learning of a Machine Learning (ML) regression model of an industrial process. The training comprising (A) preprocessing, based on an incremental data preprocessing approach, each data set from among a plurality of data sets corresponding to the ML model to generate a plurality of preprocessed datasets, wherein the received from a plurality of sensors, wherein each data set is a combination of meta data representing old data and new data seamlessly received from a plurality of sensors monitoring the industrial process; (B) extracting a plurality of meta features from each of the plurality of preprocessed data sets, the plurality meta features comprising a) classification meta features, b) regression meta features, and c) domain meta features based on a domain-meta-feature-taxonomy created for a plurality of industrial plants across a plurality of domains; (C) selecting an optimal set of meta features from among the plurality of meta features by utilizing one of a) a ML or Deep Learning (DL) technique providing static approach for selecting the optimal set of features, and b) a Q-learning based technique, utilizing one of (i) a static reward function that remains constant across episodes of Q-learning, and (ii) a dynamic reward function that changes across episodes, wherein a reward for selecting a next meta feature from among the plurality of meta features depends on one or more meta features that have already been selected in the optimal set of meta features, and wherein the selected optimal set maximizes performance of the meta learner measured in terms of an Area Under the Curve (AUC) metric, and wherein the Q-learning based technique; (D) evaluating each of the plurality of pre-processed datasets using each of the plurality of regression algorithms in accordance with the optimal set of meta features selected for each dataset by a grid search technique to determine an accuracy and a set of hyperparameters of each of the plurality of regression algorithms, wherein the optimal set of meta features selected for each dataset and the accuracy attained by each of the plurality of algorithms form a learner dataset; and (E) training the meta learner using the learner dataset to provide an output comprising the optimal regression algorithm from among the plurality of algorithms and a corresponding set of hyper parameters for self-learning of the ML regression model.

The method further comprises extracting the optimal set of meta features from a test data set received from the plurality of sensors; and obtaining via the trained meta learner a recommended regression algorithm from among the plurality of algorithms and a corresponding set of hyperparameters, that are used to retrain and retune the ML regression model during the self-learning.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIGS. 3A and 3B (collectively referred as FIG. 3) is a flow diagram illustrating a method for accelerating self-learning using meta learning in industrial process domain., using the system of FIG. 1, in accordance with some embodiments of the present disclosure.

FIG. 8A illustrates state of Q-Learning and its transitions and FIG. 8B illustrates Q-Learning dynamic reward approach, utilized for selecting the set of optimal meta features from each of the datasets for training of the meta-learner, in accordance with some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Figure 1:
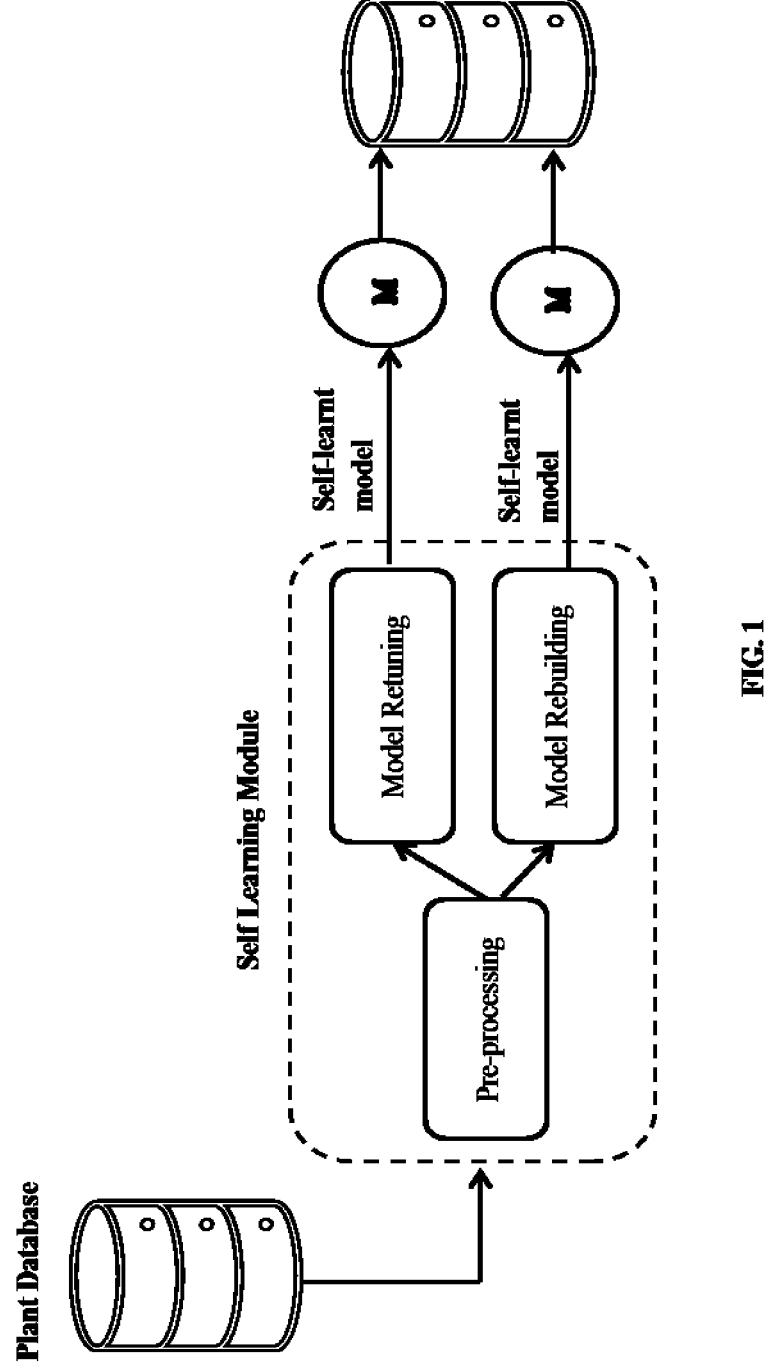
FIG. 1 illustrates an overview of a standard self-learning approach in rebuilding or retuning Machine Learning (ML) models.

A Digital Twin of any industrial process plant is a virtual representation of a physical entity or a process. The physical entity may represent components of an industrial plant such as a gas turbine, compressor, reactor etc. These components are outfitted with multiple sensors monitoring the health of individual equipment of the plant. Models, representing some functionality of the plant, are trained using the sensor data and they aid in fault diagnosis, planning, analysis and synthesis of control systems etc. Machine learning (ML) or deep learning (DL) algorithms are used to train these models, generating predictions that enable correct decision making for critical functioning of the plant. Over time, environmental factors may lead to variations in sensor readings, thus degrading the quality of model predictions, requiring the models to be re-built or re-tuned. This triggers the standard self-learning loop as shown in FIG. 1, which involves combining existing data with the newly arrived data, preprocessing the combined data and determining the best suited algorithm (among various choices, ML or DL algorithms) along with the hyperparameters, to train the model. This may require retuning or re-building models using all possible choices of algorithms and architectures for making an optimal choice which is time-consuming. Large training times incurred during the process of self-learning are debilitating and can adversely affect the functioning of industrial plants. If the time to train a model with 1 algorithm is x, and there are n such algorithms, then training time for n algorithms is nx. Further, for m models, then the total time is mnx. Another technical challenge is the large amount of time spent in pre-processing data. Each time new data comes in, it is required to combine old and new data increasing the time for pre-processing increases.

Existing efforts in the area of algorithm selection for self-learning of ML models have attempted using meta learning based approach, wherein meta features selected from datasets are used to train a meta learner for recommending suitable ML regression model. However, major challenge when building the meta learner is the extraction and selection of meta features, because the quality of meta features determines the quality of the meta learner output. Existing efforts facilitate the extraction of generic meta features, such as statistical, information theoretic, general and model based meta features, which are applicable across all domains. However, domain specific features are crucial in algorithm selection for re-building or re-tuning the ML model. Large number of irrelevant meta features increase noise in the data, affecting meta learner performance adversely, affecting algorithm selection for self-learning of the ML models. Selection of optimal number of meta features which have a significant impact on the meta learner performance is crucial technical problem. Some of the works in the literature provide an incremental meta feature selection using a Reinforcement learning (RL) based approach. A genetic algorithm is used for hyperparameter tuning, thus reducing the time and cost of human labor by automating the process. Almost all RL based approaches known use static reward function.

Embodiments of the present disclosure provide a method and system for accelerating self-learning using meta learning in industrial process domain. The system builds an application agnostic meta learner trained using optimal set of meta features selected from a larger pool comprising a) classification meta features, b) regression meta features, and c) domain meta features based on a domain-meta-feature-taxonomy created for a plurality of industrial plants across a plurality of domains. The built meta learner is not dependent on the specific dataset and associated features that are input to it. The optimal feature selection is enabled using one of ML, Deep Learning (DL) that provides static feature selection, while a Q-learning based approach is disclosed with two implementations, static reward and dynamic reward. The static reward function makes use of a SelectFromModel function, which provides the best performance in the ML based approach. In the dynamic reward based approach the reward of choosing an action depends on current state, i.e., the current selected meta features, and the reward for selecting the next meta feature, depends on the meta features that have already been selected. The dynamic reward function enables choosing optimal set of meta features based on the prior selection. Thus, is capable of adjusting to changing scenarios and revising the selection of meta features with changes in the environment when the self-learning process is triggered.

Referring now to the drawings, and more particularly to FIGS. 2A through 12, where similar reference characters denote corresponding features consistently throughout the figures, there are shown preferred embodiments and these embodiments are described in the context of the following exemplary system and/or method.

Figure 2A:
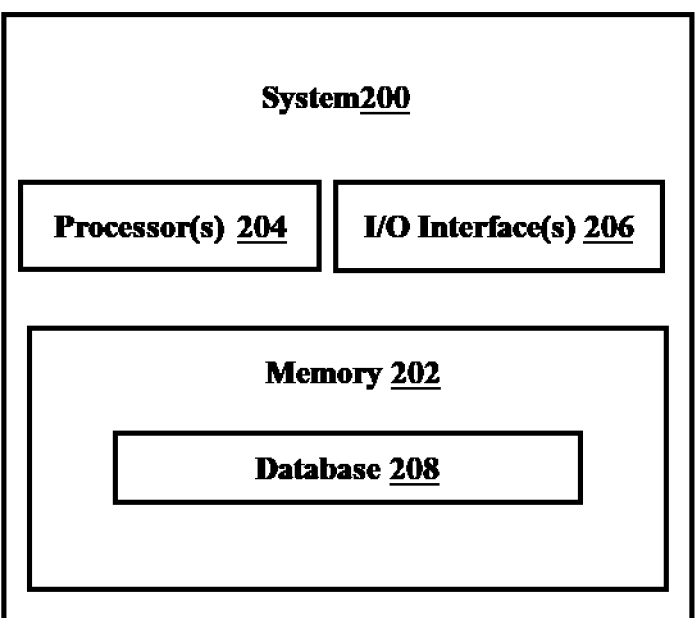
FIG. 2A is a functional block diagram of a system for accelerating self-learning using meta learning in industrial process domain, in accordance with some embodiments of the present disclosure.

FIG. 2A is a functional block diagram of a system 200, for accelerating self-learning using meta learning in industrial process domain, in accordance with some embodiments of the present disclosure.

In an embodiment, the system 200 includes a processor(s) 204, communication interface device(s), alternatively referred as input/output (I/O) interface(s) 206, and one or more data storage devices or a memory 202 operatively coupled to the processor(s) 204. The system 200 with one or more hardware processors is configured to execute functions of one or more functional blocks of the system 200.

Referring to the components of system 200, in an embodiment, the processor(s) 204, can be one or more hardware processors 204. In an embodiment, the one or more hardware processors 204 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 204 are configured to fetch and execute computer-readable instructions stored in the memory 202. In an embodiment, the system 200 can be implemented in a variety of computing systems including laptop computers, notebooks, hand-held devices such as mobile phones, workstations, mainframe computers, servers, and the like.

The I/O interface(s) 206 can include a variety of software and hardware interfaces, for example, a web interface, a graphical user interface to display the generated target images and the like and can facilitate multiple communications within a wide variety of networks N/W and protocol types, including wired networks, for example, LAN, cable, etc., and wireless networks, such as WLAN, cellular and the like. In an embodiment, the I/O interface (s) 206 can include one or more ports for connecting to a number of external devices or to another server or devices.

The memory 202 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Figure 2B:
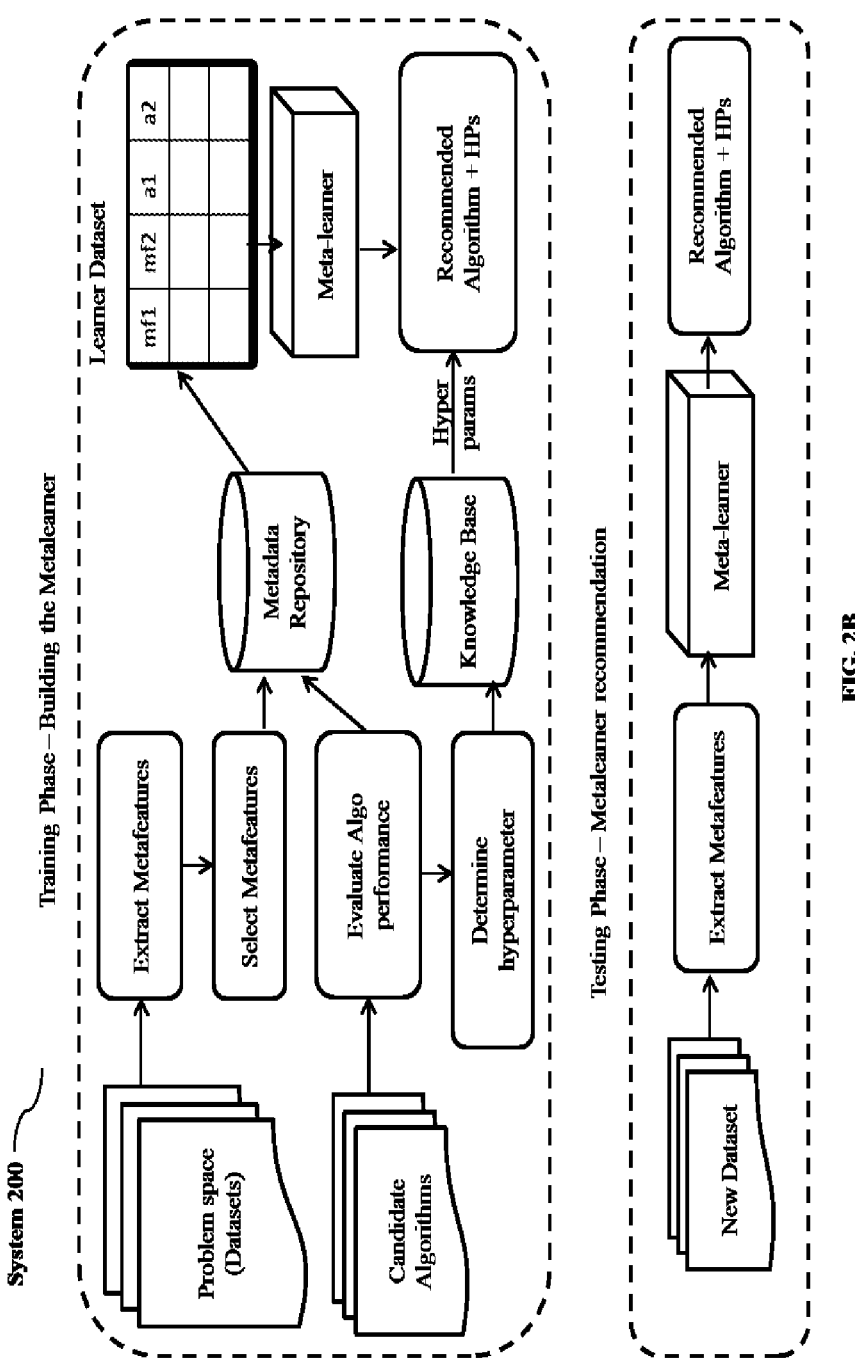
FIG. 2B illustrates an architectural overview of the system of FIG. 1, in accordance with some embodiments of the present disclosure.

FIG. 2B illustrates an architectural overview of the system of FIG. 1, in accordance with some embodiments of the present disclosure. As depicted in FIG. 2B, the memory 202 further comprises modules for meta feature extraction and selection (not shown), hyperparameter selection (not shown) and the like. The memory 202 also includes the meta learner built or trained during the training phase that enables recommending optimal regression algorithm along with associated set of hyper parameters for self-learning of a ML regression model. The modules in the memory are executed by the one or more hardware processors 204 to train the meta learner for optimal regression algorithm selection during testing phase. Further, the memory 202 includes a database 208 that stores a) a plurality of datasets, also referred as datasets, which define the problem space, b) a plurality of regression algorithms, also referred to as candidate algorithms, c) a meta data repository, d) a knowledgebase storing the set of hyperparameters identified for each regression algorithm, e) a learner dataset and the like. This meta data repository contains a) the classification meta features, b) the regression meta features, and c) the domain meta features Further, the memory 202 may comprise information pertaining to input(s)/output(s) of each step performed by the processor(s) 204 of the system 200 and methods of the present disclosure. In an embodiment, the database 208 may be external (not shown) to the system 200 and coupled to the system via the I/O interface 206. Functions of the components of the system 200 are explained in conjunction with architecture depicted in FIG. 2B and flow diagram of FIG. 3.

Figure 3A:
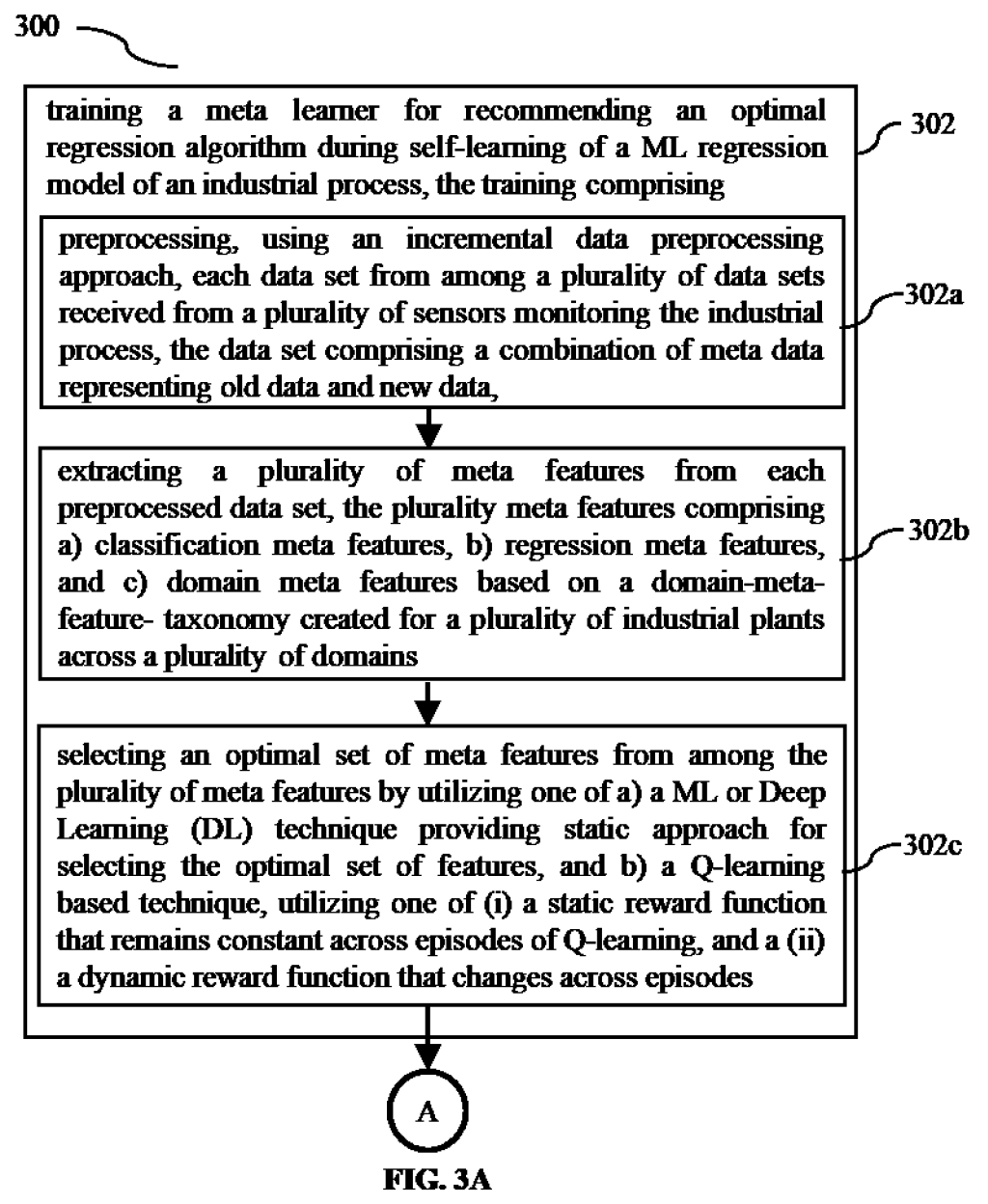

FIGS. 3A and 3B (collectively referred as FIG. 3) is a flow diagram illustrating a method 300 for accelerating self-learning using meta learning in industrial process domain., using the system of FIG. 1, in accordance with some embodiments of the present disclosure.

In an embodiment, the system 200 comprises one or more data storage devices or the memory 202 operatively coupled to the processor(s) 204 and is configured to store instructions for execution of steps of the method 300 by the processor(s) or one or more hardware processors 204. The steps of the method 300 of the present disclosure will now be explained with reference to the components or blocks of the system 200 as depicted in FIGS. 2A and 2B and the steps of flow diagram as depicted in FIG. 3. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Referring to the steps of the method 300, at step 302 of the method 300, the one or more hardware processors 204 train a meta learner for recommending an optimal regression algorithm from among the plurality of regression algorithms (candidate algorithms) during self-learning of a Machine Learning (ML) regression model of an industrial process. The system 200 has two phases, an offline training phase of training or building the meta learner, and an online testing phase for recommending the optimal regression algorithm by processing new or test data using the trained meta learner.

Training phase is explained in conjunction with steps 302*a* through 302*e*. A plurality of data sets are generated from streaming data received from a plurality of sensors monitoring the industrial process. Each data set comprising a combination of meta data representing old data and new data seamlessly received from the plurality of sensors monitoring the industrial process. The old data refers to data that has already been gathered and the new data refers to incoming data from sensors. At step 302*a*, each data set is preprocessed based on an incremental data preprocessing approach. One of the primary challenges in self-learning is the need to pre-process application data before any models (herein the meta learner) are trained. Traditional approach concatenates the new data with the old data and pre-processes the entire dataset. Over a period of time as the data size increases, the pre-processing time also increases. The preprocessing approach used by the system 200 optimizes the entire ML/DL pipeline without using old data by using the incremental approach, which is well suited for the streaming data.

Figure 4:
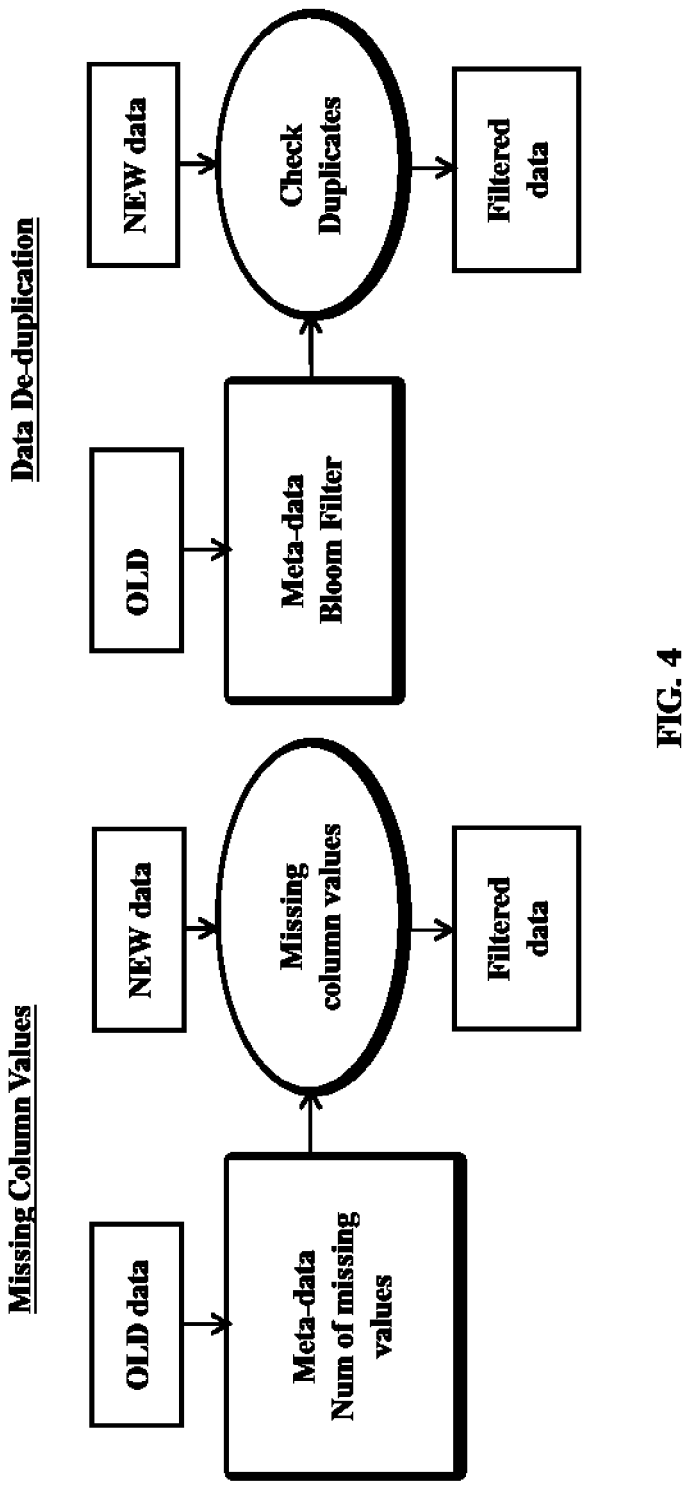
FIGS. 4, 5A and 5B depict an incremental data preprocessing approach used by the system of FIG. 1 for preprocessing data sets comprising a combination of meta data representing old data and new data to generate preprocessed datasets for training of the meta-learner, in accordance with some embodiments of the present disclosure.
Figure 5A:
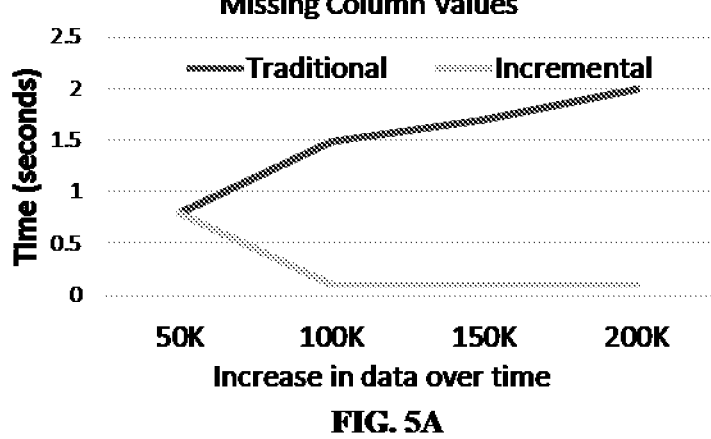
Figure 5B:
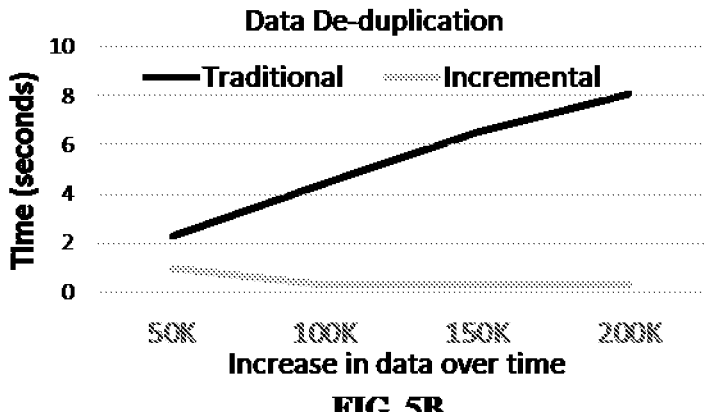

The method disclosed herein applies the known incremental approach concept but stores "meta-data" of the old data, instead of storing the entire old data in the memory and then concatenating it with new data. Since entire old data is not saved both memory consumption and processing time reduces to great extent. The significance of the incremental approach that is applied herein by the system 200 is explained using two data-preprocessing techniques as examples. Data deduplication is a common problem in real-world datasets. Duplicated rows in data lead to an increase in training time, without providing any additional information to the model. It is necessary to identify and remove the duplicated rows from incoming data. Missing column values is another issue with real-world data, where many entries of a particular feature (column) are missing. If the number of missing values is above a threshold then the feature is removed as it contributes to noise in the model training process. As shown in FIG. 4, instead of using the incremental data pre-processing architecture, the system 200 concatenates old and new incoming data, and the method extracts and stores metadata pertaining to the dataset. For e.g., in the case of missing column values, the number of missing values in a particular column is stored. When new data comes in, the number of missing values is extracted from the columns and then checked with the existing metadata if the total number of missing values exceeds a particular threshold. In the case of data-deduplication, the metadata is maintained in the form of a Bloom Filter. The Bloom Filter is a space-efficient and a probabilistic data structure known in the art., that is used to test if an element is a member of a set. When the new data comes in, the system 200 merely check if the row exists in the Bloom Filter. If it does not exist, it is added to the Bloom filter, else it is removed. Simple examples for both the cases outlined above that illustrate the scalability of the preprocessing approach, with increase in data over a period a time are explained in conjunction with FIG. 5A related to preprocessing missing column values and 5B related to prepro-cessing data de-duplication. The graphs of FIGS. 5A and 5B illustrate the efficacy of the incremental pre-processing approach as compared to the traditional approach. As the data goes on increasing, it is observed that by concatenating data, the time for pre-processing also increases. In the incremental approach since only the metadata is stored, the time remains constant. In Digital Twins for industrial pro-cess plants, the sensors are continuously monitoring data and over a period of time the size of data increases, which leads to an increase in the amount of time required for pre-processing. A speed-up of 11x form missing column values and a speed-up of 25x for data de-duplication (num-ber of data samples 200K), when compared with the tradi-tional approach is achieved. Thus, the incremental approach reduces this pre-processing time and is scalable for large workloads.

Once the data sets are preprocessed, at step 202b, the plurality of meta features are extracted from each prepro-cessed data set, which include a) the classification meta features, b) the regression meta features, and c) the domain meta features. The domain meta features are based on a domain-meta-feature-taxonomy created for a plurality of industrial plants across a plurality of domains.

Classification meta features known in the art:
1. General: General information related to the dataset, also known as simple measures, such as the number of instances, attributes and classes.
2. Statistical: Standard statistical measures to describe the numerical properties of data distribution.
3. Clustering: Clustering measures extract information about dataset based on external validation indexes.
4. Information-theoretic: Particularly appropriate to describe discrete (categorical) attributes and their rela-tionship with the classes.
5. Complexity: Estimate the difficulty in separating data points into their expected classes In one of the implementations, the classification meta features are extracted using PyMFE™ tool that provides a comprehensive set of meta-features implemented in Python.

Regression meta features: Even though the classification meta features are extracted, industrial process data com-prises of sensor data that is used to train regression models. It is necessary to use regression meta features in order to have a better understanding of the task. These meta features provide information about the nature of the input features that corresponds to the regression outputs. Essentially, they give a correlation between actual values of the input and output. The regression meta features as known in the art are extracted. The categories of regression meta features are:

Feature correlation measures: Captures the relationship of feature values with the outputs. For example:

Maximum feature correlation to the output: Calculate the absolute value of the Spearman correlation between each feature and the outputs.

$$C_1 = \max_{j=1 \ldots d} |\rho(x^j, y)| \qquad (1)$$

Where, $\rho$ is the Spearman Correlation and d is the total number of meta features Linearity measures: Estimates whether a linear function can fit data, i.e., if they are linearly distributed. For example:

Mean absolute error: Averages the absolute values of the residues of a multiple linear regressor. Lower values indicate simpler problems, which can be fitted by a linear function.

$$L_1 = \sum_{i=1}^{n} \frac{|\varepsilon_i|}{n} \qquad (2)$$

Where, $\varepsilon_i$ is the error of the $i^{th}$ training data and n is the number of data points.

Smoothness measures: Estimates the smoothness of the function that must be fitted to the data. For example:

Output distribution: Average the outputs of points closest to each other. If the outputs of similar entries are next to each other, the measure returns lower values. This is indicative of simpler problems.

$$S_1 = \frac{1}{n} \sum_{i:j \in MST}^{n} |y_i - y_j| \qquad (3)$$

Where, n is the number of data points.

Geometry, topology and density measures: Captures the spatial distribution and structure of the data. For example:

Non-linearity of a linear regressor: It first selects pairs of examples with similar outputs and creates a new test point by randomly interpolating them. Here both input and output features are interpolated. A linear regressor is trained using the original data and has its Mean Squared Error (MSE) measured for the new points.

$$L_3 = \frac{1}{l} \sum_{i=1}^{l} (f(x_i)' - y_i')^2 \qquad (4)$$

Where, l is the number of interpolated examples, $x_i$ generated and $y_i$ are their labels.

These are some of the examples of regression meta features that are used incorporated in the learner dataset for input to the meta learner. The regression meta features almost cover all aspects of data, input and output.

Figure 6:
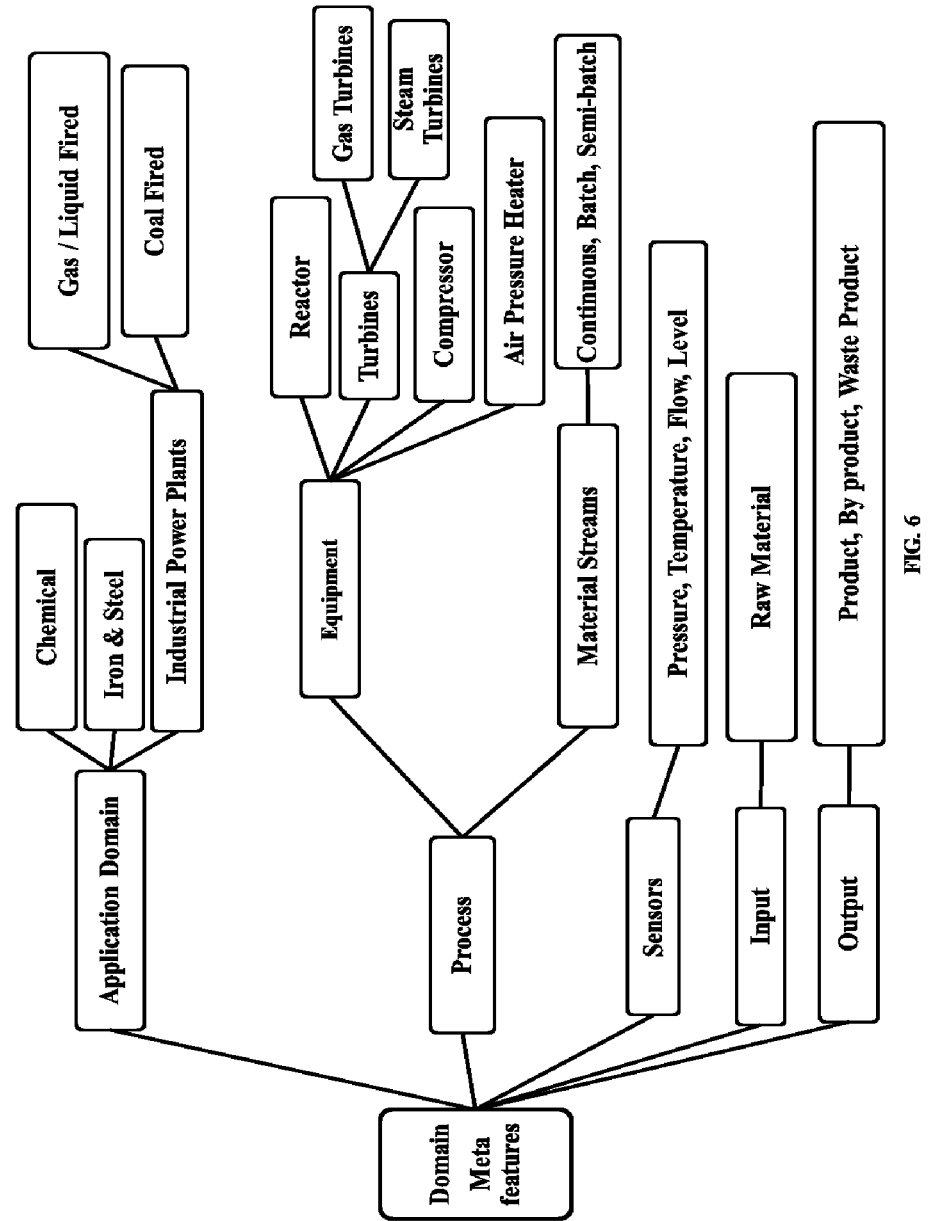
FIG. 6 illustrates example taxonomy built for identifying domain meta features used for training the meta learner, in accordance with some embodiments of the present disclosure.

Domain meta features: Engineered meta features dis-cussed above often have limitations in terms of expressive-ness of the underlying domain. Domain experts are capable of identifying features that inherently describe the domain, while distinguishing it from other domains. This facilitates the training process of the meta learner, improving the meta learner (model accuracy). The system 200 builds a tax-onomy of domain meta features of the industrial process domain. As depicted in FIG. 6 the industrial processes can be from varied domains such as chemical, power plants, cement etc. Each sub-domain has its own unique set of inputs and outputs. Every industrial plant is also distin-guished by the components that make up the plant and the material flows that determine how the components interact with each other. The cardinality of the components is significant in the design and architecture of industrial plants. Table-A below depicts a snapshot of the classification of meta features 3 data sets (1) Chemical process domain (2) Gas fired power plant and (3) Coal fired power plant. The taxonomy disclosed by the method 300 is extensible and can incorporate additional features depending on the require-ments of various plants from the industrial domain. The taxonomy can also be extended to other domains as well.

TABLE A

| Domain Meta features | TE | GT | APH |
|---|---|---|---|
| Application Domain | Chemical | Industrial Power Plant | Industrial Power Plant |
| SubDomain | Organic | Gas | Coal fired |
| Input1 | A | Natural Gas | Coal |
| Input2 | B | Air | Air |
| Input3 | C | Water | Water |
| Input4 | D | Ammonia | Ammonia, Limestone |
| Input5 | | Limestone | Limestone |
| Input6 | | | Biomass |
| Output 1 | P1 | Electricity | Electricity |
| Ouput 2 | P2 | Gypsum | Flu Gas |
| Output 3 | P3 | Steam | Fly Ash |
| Output 4 | P4 | | Bottom Ash |
| Output 5 | NA | | Gypsum |
| Output 6 | NA | | Steam |
| E_Boiler | 0 | 1 | 1 |
| E_Reactor | 6 | 0 | 1 |
| E_Compressor | 8 | 0 | 0 |
| E_Condensor | 2 | 1 | 1 |
| E_Separator | 1 | 0 | 0 |
| E_Stripper | 1 | 0 | 0 |
| E_Turbine | 0 | 2 | 3 |
| E_HeatExchanger | 5 | 0 | 1 |
| E_Pulverizer | 0 | 0 | 1 |
| E_Furnace | 0 | 0 | 0 |
| E_Unloader | 0 | 0 | 1 |
| E_Stacker | 0 | 0 | 1 |
| E_Reclaimer | 0 | 0 | 1 |
| E_Silo | 0 | 0 | 1 |
| E_Preheater | 0 | 0 | 1 |
| E_Precipitator | 0 | 0 | 1 |
| E_Fan | 0 | 0 | 1 |
| E_Pump | 0 | 0 | 1 |
| E_Reheater | 2 | 0 | 1 |
| E_Economizer | 0 | 0 | 1 |
| E_Generator | 0 | 2 | 0 |
| E_Transformer | 0 | 1 | 0 |
| E_DistillationTower | 2 | 0 | 0 |

Upon extraction of meta features capturing various aspects of data, at step 302c an optimal set of meta features is selected from among the plurality of meta features. The system 200 provides a plurality of options for selecting the set of optimal meta features, and the option can be set by a user as per end application requirements. The optimal set of meta features selection from among the plurality of meta features utilizes one of a) a ML or Deep Learning (DL) technique providing static approach for selecting the optimal set of features b) a Q-learning based technique, utilizing one of (i) a static reward function that remains constant across episodes of Q-learning and a (ii) a dynamic reward function that changes across episodes. A reward for selecting a next meta feature from among the plurality of meta features depends on one or more meta features that have already been selected in the optimal set of meta features. The selected optimal set maximizes performance of the meta learner measured in terms of an Area Under the Curve (AUC) metric, and wherein the Q-learning based technique.

ML based static key feature selection approach: Select-FromModel is a functionality in Scikit-learn™ library. The 'Scikit-learn: Machine Learning in Python' is a library of machine learning models and other methods of feature extraction and selection. For a given ML model, it determines importance values of all the features using the ML model. Based on a specified threshold k, it returns the top k meta features. If threshold is not specified, then the mean is considered to be the threshold. The method utilizes the SelectFromModel to get k best meta features from a given set of input meta features, which are then are used for training the meta learner.

Figure 7:
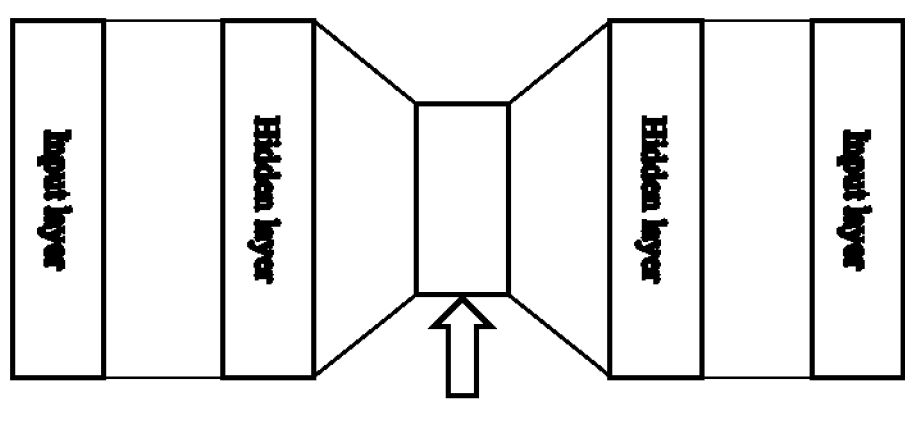
FIG. 7 illustrates a Deep Learning (DL) bottle neck layer architecture used for selecting a set of optimal meta features from each of the datasets for training of the meta-learner, in accordance with some embodiments of the present disclosure.

DL based static key feature selection approach—This is used to select meta features given a set of extracted meta features using a bottleneck based Neural Network (NN) architecture, which is a Multi-Layer Perceptron (MLP). As depicted in FIG. 7 a Multi-Layer Perceptron, of X layers is present. One layer among the X layers is of smaller dimension as compared to others. The output from this layer represents a compact set of features as compared to the input features set. The entire MLP network is trained, the inputs of which are the set of extracted meta features of step 302b. For example, 5 classes of regression algorithms which are tested by the method, represent the outputs. After the network is trained, the training data meta features are passed through the NN and the outputs of the bottleneck layer are obtained. This vector represents a compacted set of meta features to train the meta learner. This is an alternate method for meta feature selection, which selects a subset of meta features by removing the redundant meta features. The intuition behind this approach is that, instead of removing any meta feature manually, a compact vector is created with information pertaining to all meta features.

Q-Learning based approach: One of the biggest challenges in the static key feature selection is that self-learning may require meta features to be revised in order to maintain the model (meta learner) accuracy over a period of time. In the DL based approach, a low dimensional representation of the input vector of meta features is used. However, since an ML based meta learner (KNN, Random Forest etc.) is utilized, using actual values of selected meta features gives a better performance than a low dimensional approximation. In ML based method, meta features are selected greedily, based on the importance value of a meta feature in comparison to other meta features. Ideally, required is to determine a subset of meta features that ensure optimal accuracy, without limiting the method only to meta features based on their importance values. An incremental approach, in which the accuracy of the meta learner on smaller subsets of the meta features can be used as a guiding light for selecting more meta features. This can be achieved by Reinforcement Learning (RL). The RL methodology solves continuous action, decision problems. It involves selecting an action, which is best suited for achieving the end goal. It comprises of 2 entities—agent and environment. The agent in state $S_t$ takes an action at in the environment which gives a reward $r_t$ in return for the action, making the agent enter a new state $s_{t+1}$. The actual reward received by the agent from the environment is at the end of the episode.

Figure 8A:
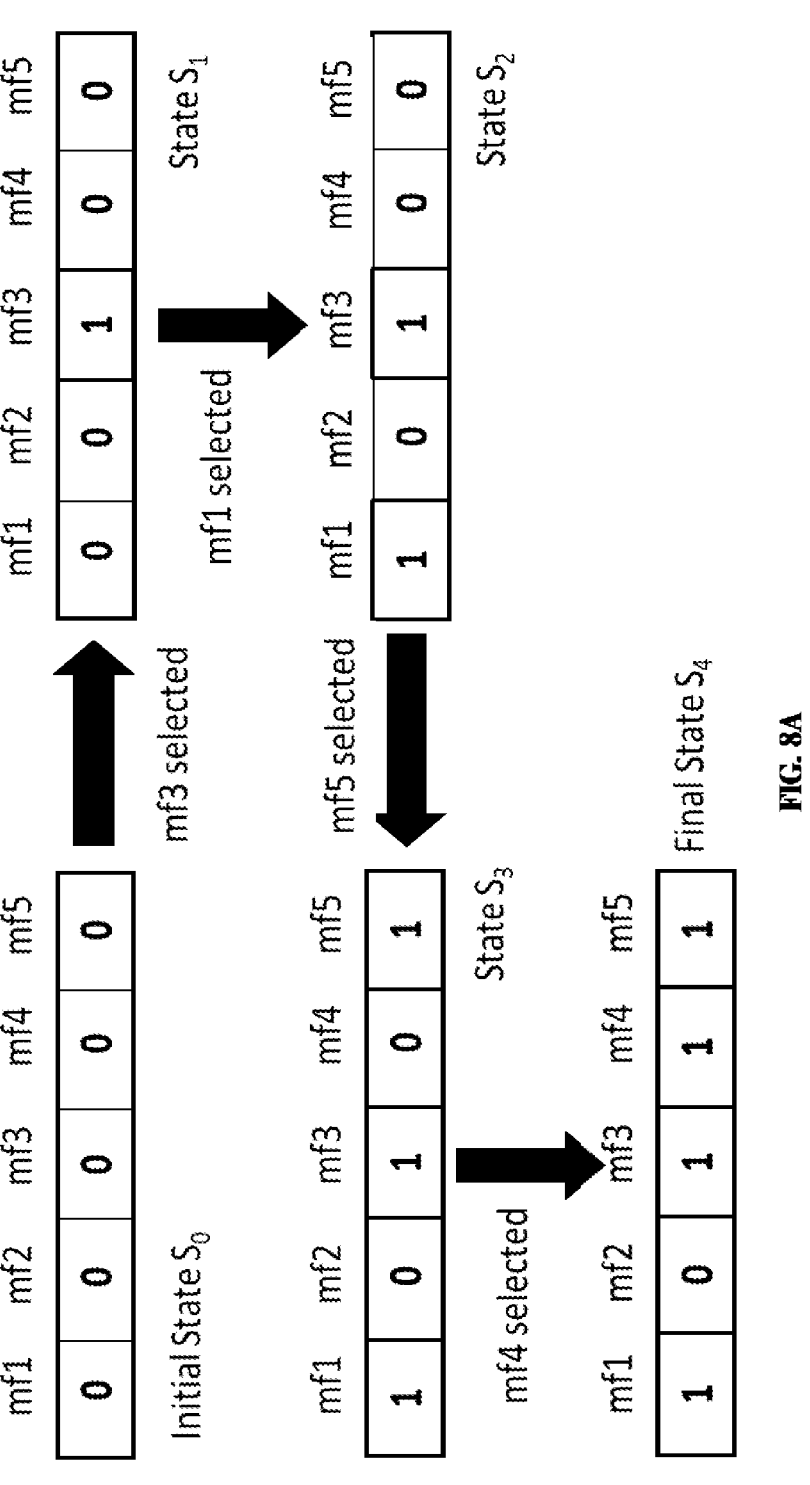
Figure 9:
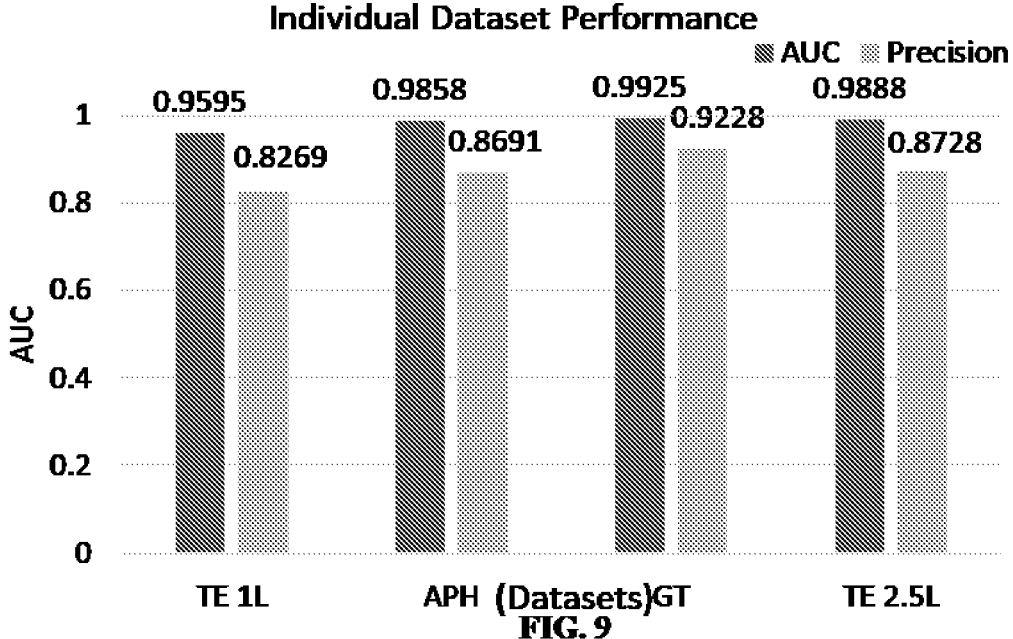
FIGS. 9 through 12 illustrate performance analysis of the system of FIGS. 2A and 2B for accelerated self-learning, in accordance with some embodiments of the present disclosure.

Q-Learning is a well-known form of RL, which employs a Q-table that stores rewards of all state-action pairs. Q-table is indexed by a tuple {current state, next action}. Initially the reward values are unknown, and the table is initialized with random values. As the agent takes steps in the environment, the rewards get updated in the Q-Table. Throughout the process of RL and its episodes, this Q-table is trained. For large RL problems, the Q-table becomes very large, leading to memory issues for storage and increased in access times. Recent works have approximated the Q-table by a Neural Network (NN). The NN takes as input the current state and action and predicts the reward value as output. In essence, the NN is now doing the work of the Q-Table. As the agent takes steps in the environment, the NN is trained to improve the approximation of reward values. Such an NN is known as a Deep Q Network (DQN). A DQN emulates a Q-table by predicting the next best action given a current state as input. The DQN is designed to solve a classification problem of predicting the next best action, rather than a regression problem of predicting reward values. This requires storing only the model parameters and also speeds up the inference process, keeping it constant over time. Thus, the method 300 in one implementation builds a Q-learning approach DQN, wherein the action is selecting a meta feature and goal is to select a subset of meta features that provide the optimal meta learner accuracy. The selection of optimal set of features with the Q-learning starts with zero selected meta features and take a series of actions, to incrementally select meta features one at a time, until a prespecified target of meta features is reached. The process starts with a state of all 0s, and at each step 1 bit(action) is selected and changed it to 1. The state is represented as a k-hot embedding vector. The number of bits represent the cardinality of the extracted meta features. The bits are indexed by the meta feature number, starting from 0. Bits corresponding to meta features already selected are set to 1 and the rest are 0. An action taken means select a bit that is 0 and change it to 1, implying that a meta feature that was previously not selected, has now been selected. This process of the state of Q-Learning and its transitions is illustrated in FIG. 8A.

RL has two paradigms exploitation and exploration as known in art. The traditional Q-Table in Q-Learning states that a reward earned by taking an action in a particular state. The DQN approach enables the neural network to predict the best action. The method disclosed herein utilizes the DQN approach to select the best action, which corresponds to the exploitation paradigm of RL. In the exploration phase an action is selected at random. The DQN takes the state values as input and the output is the estimated reward value for each action. The agent randomly chooses two actions, one with probability p and the other with probability (1−p), that can maximize the reward. Initially the approach explores, by making random choices. As training progresses, p gradually decrease from 1 to 0 and stabilizes. The method 300 disclosed two approaches for defining reward or reward functions—a static and a dynamic approach.

Static Reward Function (static reward): The reward for each function is set statically before the start of any episode. The SelectFromModel function is used by a Random Forest classifier to get the importance values of the meta features and these values are considered to be the rewards. This reward remains constant across episodes. The static reward function is described in the algorithm 1 below:

---
Algorithm 1: Static Reward
---

Data: The set of all meta features MF, the number of meta features to
select
m <= MF, number of episodes e
Result: The set of best meta features Mlist
Create the set of states S, actions A
Get importance of each meta feature from select from model
Set Reward(MF)=Importance(MF)
i ← 0
allepsMlist ← null
while i <e do
   Set state to Initial State
   Mlist ← null
   totalreward ← 0
   while —Mlist— <= m do
      Give current state to DQN
      Get best action as output from DQN or randomly choose an action.
      Take the action to get next state
      Get actual reward and get the probability values from DQN for each
      action
      Train the DQN
      Mlist ← Mlist Uaction
      totalreward ← totalreward + reward
   end -continued ---
Algorithm 1: Static Reward
--- allepsMlist[totalreward] ← Mlist
end
maxreward ← max(allepsMlist)
maxMlist ← allepsMlist[maxreward]
return maxMlist

---

Dynamic Reward Function (dynamic reward): As understood by person skilled in the art, the reward of choosing an action depends on the current state. In this scenario, the meta features selected form the state and the reward for selecting the next meta feature, depends on the meta features that have already been selected. The reward is changed according to the current state, and the next action. Essentially, meta features that have already been selected are considered along with one new selected meta feature to it. Further, these meta features are extracted, and a Random Forest Classifier is trained. The Area Under Curve (AUC) score of the classifier represents the reward for that action. The reward is calculated, and the reward value of the action is changed once it is selected from the DQN or randomly. FIG. 8B represents an example of the dynamic reward function for meta feature selection. As depicted in the FIG. 8B, of 5 meta features are assumed to be present initially—mf1, mf2, . . . , mf5. Initially, each meta feature is considered individually, and the AUC score is determined using a classifier (Random Forest, as example in this case). The meta feature with the best AUC (mf3) is selected and the rewards of all the remaining actions/meta features are calculated with the already selected meta feature mf3 (Step 2 in FIG. 8B). For each of them, the process of determining the AUC by training a classifier is repeated. Therefore, the reward for selecting a meta feature is dependent on meta features that have already been selected. The dynamic reward function is capable of adjusting to changing scenarios and revising the selection of meta features with changes in the environment when the self-learning process is triggered. An algorithm 2 below explains the dynamic reward.

---
Algorithm 2: Dynamic Reward
---

Data: The set of all meta features MF, the number of meta features to
select
m <= MF, number of episodes e
Result: The set of best meta features Mlist
Create the set of states S, actions A
i ← 0
allepsMlist ← null
while i <e do
   Set state to Initial State
   Mlist ← null
   totalreward ← 0
   while —Mlist— <= m do
      Give current state to DQN
      Get best action as output from DQN or randomly choose an action.
      Take the action to get next state
      Mlist ← Mlist Uaction
      AUC RandomForest(Mlist)
      reward=AUC
      Get actual reward and get the probability values from DQN for each
      action
      Train the DQN
      totalreward ← totalreward + reward
   end
   allepsMlist[totalreward] ← Mlist
end
maxreward ← max(allepsMlist)
maxMlist ← allepsMlist[maxreward]
return maxMlist

---

Once the set of optimal meta features is selected in step 302c using one of the multiple approaches disclosed, at step 303d, each dataset is evaluated using each of the plurality of regression algorithms in accordance with the optimal set of meta features selected for each dataset. The evaluation uses a grid search technique to determine an accuracy and a set of hyper-parameters of each of the plurality of regression algorithms. The optimal set of meta features selected for each dataset and the accuracy attained by each of the plurality of algorithms form the learner dataset and is maintained in the database 108.

Further, at step 302e, the meta learner is trained using the learner dataset to provide an output comprising the optimal regression algorithm from among the plurality of algorithms and a corresponding set of hyper parameters for self-learning of the ML regression model.

Once the meta learner is trained or built, then in is used for online phase, also referred as testing phase wherein new data or test data is processed to suggest optimal regression algorithm for a specific model that has triggered the self-learning loop. Thus, at step 304 of the method 300, the one or more hardware processors 204 extract the optimal set of meta features from the test data set received from the plurality of sensors. Further, at step 304 of the method 300, the one or more hardware processors 204 obtain via the trained meta learner a recommended regression algorithm from among the plurality of algorithms and a corresponding set of hyperparameters, that are used to retrain and/or retune the ML regression model during the self-learning loop.

Figure 12:
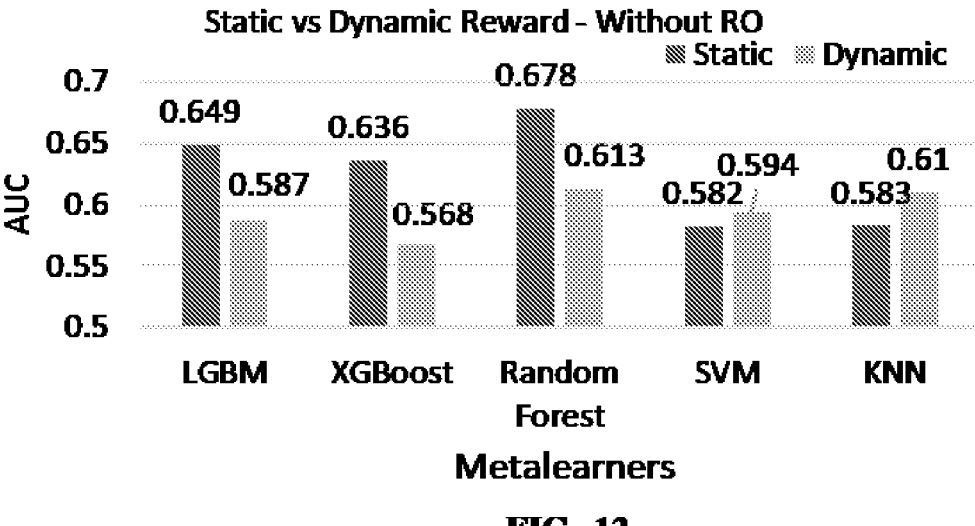

Industrial Process Data—Task Creation: The system 200 is validated with experiments conducted on 2 publicly available datasets and one dataset created using in-house simulator, from the industrial process domain. Each dataset is divided into tasks of size 1K as shown in FIG. 12, i.e., each task comprises of 1K data instances. The tasks generated from all 3 datasets are given as input to the meta learner. Details of the 3 datasets are as follows:

1) Tennessee Eastman (TE) Data: Heysem Kaya, P˜Anar T˜Afekci and Erdin˜A Uzun. '*Predicting CO and NOx emissions from gas turbines: novel data and a benchmark PEMS*', *Turkish Journal of Electrical Engineering, Computer Sciences*, vol. 27, 2019, pp. 4783-4796—Simulates chemical processes and is extensively used for benchmarking in fault diagnosis and process control. The process comprises of 5 operating units: reactor, condenser, vapor-liquid separator, recycle compressor and product stripper. TE dataset has 250K data instances. Tasks are created with 1K instances per task, i.e., 250 tasks are available (input data points for the meta learner). In the experiments, initially results were tested with 100K TE data points (i.e., 100 tasks), followed by experiments on the entire dataset with 250 tasks.

2) UCI Gas Turbine: Shu, Yang, Zhangjie Cao, Chenyu Wang, Jianmin Wang, and Mingsheng Long. "*Open Domain Generalization with Domain-Augmented Meta-Learning.*" *In Proceedings of the IEEE/CVF Conference on Computer Vision and Pattern Recognition*, pp. 9624-9633. 2021—This is a dataset gathered from 11 sensors, aggregated over an hour (by means of average or sum) from a gas turbine, for the purpose of studying flue gas emissions (CO and NOx). The dataset comprises of 36733 instances which are sorted in chronological order. The dataset is divided into tasks of 1K instances. Thus, there are ~36 tasks that form the input for the meta learner.

3) APH simulated data: Air Pressure Heater is a component of coal fired power plants. ~100K data points of the plant were simulated from Wang, Limin, Yufan Bu, Dechao Li, Chunli Tang, and Defu Che. "*Single and multi-objective optimizations of rotary regenerative air preheater for coal-fired power plant considering the ammonium bisulfate deposition.*" *International Journal of Thermal Sciences* 136 (2019): 52-59. A thermal model was used for forecasting and synthetic data generation. Each data point represents sensor readings of a single day-Gupta, A, Jadhav, V, Patil, M, Deodhar, A, Runkana, V. "*Forecasting of Fouling in Air Pre-Heaters Through Deep Learning.*" *Proceedings of the ASME* 2021 *Power Conference. ASME* 2021 *Power Conference. Virtual, Online.* Jul. 20-22, 2021. V001T01A002. ASME. Daily variations in the input parameters and measured temperatures are captured in the simulated data. Over a period of time, the operating conditions of the machine changes leading to variation in the operational parameters of the plan. Each set of operational parameters are referred to as a regime. Data is generated for both (1) Varying input parameters for a single regime (2) Varying operational parameters to simulate data across multiple regimes. Also simulated, is the data for 19 such regimes as part of this dataset.

Experiments and Results: All experiments were conducted on a Linux CentOS server with 256 GB RAM and 56 core CPUs. The 3 datasets discussed above were used. The results have been validated on 5 regression models namely, Adaboost, Xgboost, Multi-layer Perceptron, Random Forest and SVM. Multiple meta learners are trained, namely, KNN, Random Forest, XGBoost, LGBM etc. to study the variation of meta learner performance across the regression algorithms. The Area Under the Curve(AUC) metric is used to define the performance of the meta learner. The precision metric depicts the efficacy of the meta learner in terms of true predictions amongst all predictions. For the ML based approach, the SelectFromModel function is used. In the results, the model used by SelectFromModel is used to select meta features based on the importance values. Experiments were done with various models for SelectFromModel (to select meta features) and for testing performance of meta learners. Some examples include Tree based classifiers such as Random Forest (RF), Extreme Gradient Boosting (XGBoost), Light Gradient Boosting Machine (LGBM). A K-Nearest Neighbors (KNN) classifier and a Support Vector Regression (SVR) algorithm. For the RL based approach a GYM library (Brockman, Greg, Vicki Cheung, Ludwig Pettersson, Jonas Schneider, John Schulman, Jie Tang, and Wojciech Zaremba. "*Openai gym.*" *arXiv preprint arXiv:* 1606.01540 (2016). is used to implement the DQN approach. A new GYM environment is defined for the problem herein.

A. Individual Datasets: First experiment was to study the performance of each dataset independent of other datasets. For each of the 3 datasets, a train-test split of 70-30. The tasks for each dataset are created as described in Section VIII. The performance of the meta learner for the different datasets is measured by the AUC and the precision value determines the quality of the recommendation. Experiments are conducted with multiple Meta learners (KNN, LGBM, Random Forest, SVR) and results are presented in FIG. 9, with results for the best performing meta learner in each case. It is observed that individual datasets achieve a very good AUC approximately $>=0.95$ in all cases. The advantage in this case, is that the test tasks are sampled from the same dataset, as the train task, so the train and test tasks belong to the same application. As a result, the meta learner is able to train with a very high accuracy. For the next set of experiments, tasks from all 3 datasets are combined to study the performance of various meta learners.

B. Meta learner performance without random oversampling: Here, experiments are performed by combining tasks from all 3 datasets (i.e., a total of 392 tasks are obtained) and train the meta learner on all the tasks. The results are studied on raw application data, which may be imbalanced (i.e., without random oversampling). Domain meta features are incorporated, and the performance of the meta learner is compared without domain meta features. The results are represented in Table I below.

It is observed that domain meta features, significantly contribute to the performance of the meta learner. KNN attains an AUC of 0.674 with the inclusion of domain meta features and performance degrades (AUC is 0.637) when domain meta features are excluded. Similar boost in meta learner performance is observed for other meta learners as well. Incorporating domain meta features enables the meta learner to discern features that may not have been obvious, thus improving the meta leaner performance significantly.

C. Meta learner performance with random oversampling: Same

TABLE I

| Domain Meta features | Meta learner | SFM Model | AUC | Precision |
|---|---|---|---|---|
| No | KNN | RF | 0.637 | 0.553 |
| No | RF | RF | 0.632 | 0.501 |
| No | XGB | XGBoost | 0.58 | 0.412 |
| No | LGBM | LGBM | 0.542 | 0.364 |
| Yes | KNN | RF | 0.674 | 0.583 |
| Yes | RF | RF | 0.604 | 0.432 |
| Yes | XGB | XGBoost | 0.617 | 0.418 |
| Yes | LGBM | LGBM | 0.566 | 0.382 | above experiments discussed in meta learner performance without random oversampling are repeated with random oversampling of the regressor classes. This overcomes any class imbalance in the data. A significant improvement is observed in the AUC attained by the meta learner in both cases—with and without domain meta features as depicted in Table II.

TABLE II

| Domain Meta features | Meta learner | SFM Model | AUC | Precision |
|---|---|---|---|---|
| No | KNN | RF | 0.924 | 0.719 |
| No | RF | RF | 0.979 | 0.894 |
| No | XGB | XGBoost | 0.9769 | 0.866 |
| No | LGBM | LGBM | 0.9799 | 0.867 |
| Yes | KNN | RF | 0.919 | 0.75 |
| Yes | RF | RF | 0.982 | 0.899 |
| Yes | XGBoost | XGB | 0.989 | 0.887 |
| Yes | LGBM | LGBM | 0.979 | 0.83 |

It is observed that the inclusion of domain meta features gives better performance than without domain meta features. However, the difference in performance is not very significant. This implies that, when data is highly balanced, domain meta features have a lesser impact on the meta learner performance, as the meta learner already has sufficient balanced data (due to oversampling techniques) during training.

Figure 10:
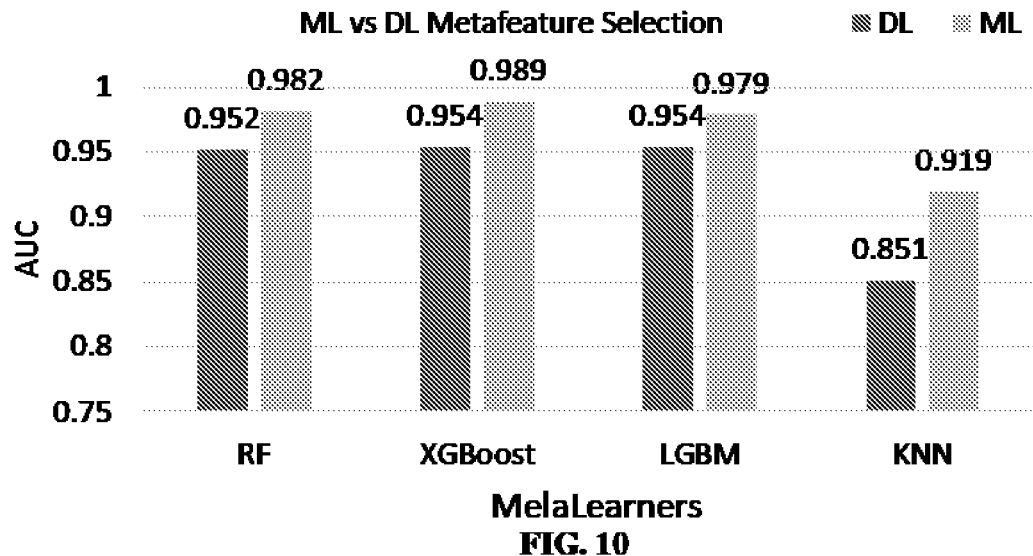
Figure 11:
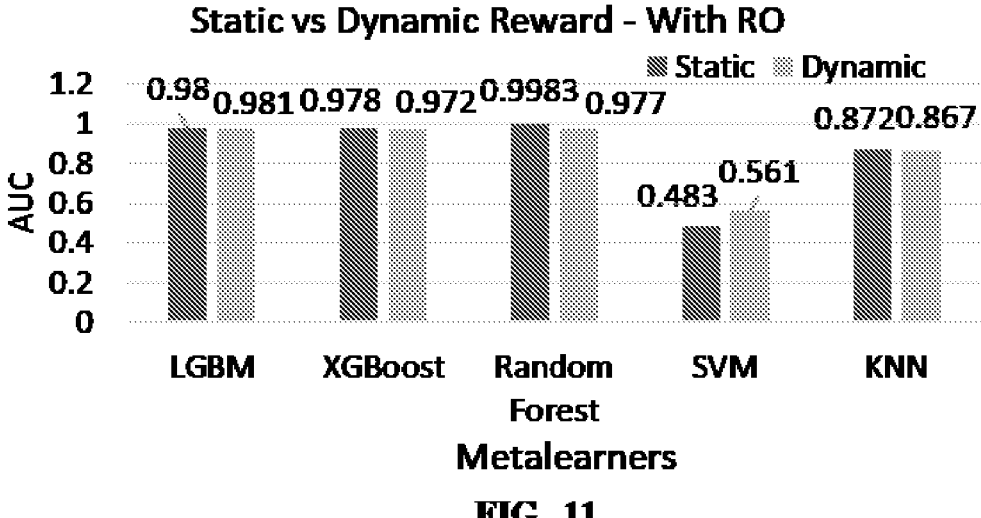

D. Meta learner performance with Bottleneck layer: The previous two approaches depict the performance of the meta learner trained using an ML based approach. Now the meta learner is trained with meta features extracted using the bottleneck layer in a Multi-layer Perceptron network architecture (refer table III) depicted in FIG. 7 to get a compressed set of meta features. This is compared with the ML based approach of using the SelectFromModel to select an optimal set of meta features. While the performance of the DL based (bottle-neck) approach as depicted in FIG. 10 is close to the ML based approach, it does not outperform the ML based approach. In the ML based approach (refer Table II) the Meta learner shows the best performance, when SelectFromModel uses the same ML model for extracting meta features. For example: meta learner is XGBoost and model to extract importance values using SelectFromModel is also XGBoost, an AUC of (0.989) is attained. This is because the meta learner is given the best meta features as input, whereas the vector of meta features obtained from the DL network are an approximation. HENCE the ML based approach is capable of training a meta learner with higher AUC as compared to the DL based approach. However, in case of raw input data (without random oversampling), it is observed that the DL based approach, achieves an AUC of 0.679 using Random Forest as the classifier, while the ML based approach attains a best AUC of 0.674 using a KNN as classifier.

TABLE III

| RO | Metal learner | AUC | Precision |
|---|---|---|---|
| Yes | RF | 0.952 | 0.764 |
| Yes | SVM | 0.539 | 0.168 |
| Yes | XGBoost | 0.954 | 0.811 |
| Yes | LGBM | 0.954 | 0.787 |
| Yes | KNN | 0.851 | 0.522 |
| No | RF | 0.679 | 0.342 |
| No | SVM | 0.535 | 0.365 |
| No | XGBoost | 0.653 | 0.283 |
| No | LGBM | 0.629 | 0.322 |
| No | KNN | 0.629 | 0.34 |

E. Q-Learner based approach: In this experiment, the performance of the meta learner is illustrated with the Q-Learning based approach. Table IV depicts meta learner performance without random oversampling and Table V depicts the meta learner performance with random oversampling.

TABLE IV

| Reward Function | Meta learner | AUC | Precision |
|---|---|---|---|
| Static | LGBM | 0.98 | 0.845 |
| Static | XGBoost | 0.978 | 0.848 |
| Static | Random Forest | 0.9983 | 0.878 |
| Static | SVM | 0.483 | 0.144 |
| Static | KNN | 0.872 | 0.598 |
| Dynamic | LGBM | 0.981 | 0.847 |
| Dynamic | XGBoost | 0.972 | 0.8 |
| Dynamic | Random Forest | 0.977 | 0.84 |
| Dynamic | SVM | 0.561 | 0.178 |
| Dynamic | KNN | 0.867 | 0.606 |

TABLE V

| Reward Function | Meta learner | AUC | Precision |
|---|---|---|---|
| Static | LGBM | 0.649 | 0.458 |
| Static | XGBoost | 0.636 | 0.385 |
| Static | Random Forest | 0.678 | 0.389 |
| Static | SVM | 0.582 | 0.383 |
| Static | KNN | 0.583 | 0.383 |
| Dynamic | Random Forest | 0.613 | 0.504 |

TABLE V-continued

| Reward Function | Meta learner | AUC | Precision |
|---|---|---|---|
| Dynamic | XGBoost | 0.568 | 0.434 |
| Dynamic | LGBM | 0.587 | 0.469 |
| Dynamic | SVM | 0.594 | 0.392 |
| Dynamic | KNN | 0.61 | 0.422 |

As expected, the performance, of the meta learner for both static and dynamic reward functions is much better on balanced data (with random oversampling) as compared to imbalanced data. As seen in the graphs depicted in FIG. 11 and FIG. 12, meta learner performs better with a static reward function as compared to a dynamic reward function, in both cases (i.e., with and without random oversampling). In case of static reward function, the reward is defined as the importance value (obtained using SelectFromModel function). Study shows that the importance values give the best meta learner performance in most cases. The dynamic reward function is based on the AUC metric, which comes close to the static reward function when random oversampling is used.

The findings of building a meta learning based approach for self-learning are provided below: It is observed that in industrial process applications, tree based classifiers such as Random Forest or LGBM show the best performance as meta learners, as compared to SVM and KNN. This is primarily because the input to the meta learner is in the form of a uniformly scattered 'm' dimensional space, where 'm' is the number of meta features. It is challenging to cluster the points based on their output. Tree-based ML algorithms are known to work well in such scenarios.

Pre-processing is a significant module of self-learning, as the incoming data needs to be cleaned. The input sensor data increases over time; consequently, increasing the pre-processing time in the traditional approach. The incremental approach is able to effectively handle this issue by pre-processing using stored metadata and not the entire dataset.

Domain meta features significantly improve the performance of a meta learner. Domain knowledge enables the meta learner to discern features in application data that may not otherwise have been obvious. The observations are corroborated through experiments with and without random oversampling of the input data. As observed in Tables I and II, when application data is well balanced, domain meta features have a lesser impact, as compared to applications that are highly imbalanced. Since real-world data is usually imbalanced, domain meta features are a substantial value-add for improving the performance of the meta learner.

For meta feature selection, the ML based approach using SelectFromModel outperforms the DL based approach, since the vector of meta features obtained in the DL based approach is an approximation. This is because the SelectFromModel function can choose its model to be the same as the meta learner when selecting meta features, which significantly boosts the meta learner performance. However, the DL based approach does achieve better performance than the ML based approach when the data is imbalanced for the Random Forest Meta learner.

Q-Learning based approaches (both static and dynamic reward functions), tend to have slightly lower performance as compared to the ML based approach. Q-Learning is based on exploration and exploitation, and exploration involves randomly selecting meta features which may not necessarily represent the optimal subset of meta features.

Static reward function approach performs slightly better than the Dynamic reward function for the very reason that SelectFromModel is used to select meta features in the static reward function. However, the trade-off is that the dynamic reward function is capable of adjusting to changing scenarios, thus revising the selection of meta features with changes in the environment when the self-learning process is triggered. In the long run, the dynamic reward function is expected to enable the meta learner to provide more stable and relevant recommendations, without human intervention.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

Thus, the embodiments herein provide meta learning based approach for accelerating the self-learning process in Digital Twins of industrial process plants. Sensors continuously monitor the health of these process plants and generate large volumes of data. The method incrementally processes this data, thus enabling scalability of the pre-processing function, which otherwise, adds a significant amount of time to the entire ML/DL pipeline. Data in industrial plants usually comprises of sensor readings and hence the models built using the application data are regression models. In addition to the general and statistical meta features (classification features), the method also extracts regression model meta features that enhance the meta learner performance. Further, domain meta features introduced lead to a significant improvement in meta learner performance especially with highly imbalanced data. Furthermore, the optimal meta feature selection step improves the quality of predictions made by a meta learner. The various static and dynamic techniques for optimal meta feature selection using machine learning, deep learning and reinforcement learning are provided.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method comprising:
training a meta learner for recommending an optimal regression algorithm from among a plurality of regression algorithms during self-learning of a Machine Learning (ML) regression model of an industrial process, the training comprising:
preprocessing, based on an incremental data preprocessing approach, each data set from among a plurality of data sets corresponding to the ML regression model to generate a plurality of preprocessed data-sets, wherein each data set is a combination of meta data representing old data and new data seamlessly received from a plurality of sensors monitoring the industrial process;
extracting a plurality of meta features from each of the plurality of preprocessed data sets, the plurality meta features further comprising a) classification meta features, b) regression meta features, and c) domain meta features based on a domain-meta-feature-taxonomy created for a plurality of industrial plants across a plurality of domains;
selecting an optimal set of meta features from among the plurality of meta features by utilizing one of a) a ML or Deep Learning (DL) technique providing static approach for selecting the optimal set of meta features, and b) a Q-learning based technique, utilizing one of (i) a static reward function that remains constant across episodes of Q-learning, and (ii) a dynamic reward function that changes across episodes, wherein a reward for selecting a next meta feature from among the plurality of meta features depends on one or more meta features that have already been selected in the optimal set of meta features, and wherein the selected optimal set maximizes performance of the meta learner measured in terms of an Area Under the Curve (AUC) metric;
evaluating each of the plurality of preprocessed datasets using each of the plurality of regression algorithms in accordance with the optimal set of meta features selected for each data set by a grid search technique to determine an accuracy and a set of hyper-parameters of each of the plurality of regression algorithms, wherein the optimal set of meta features selected for each data set and the accuracy attained by each of the plurality of regression algorithms form a learner dataset; and
training the meta learner using the learner dataset to provide an output comprising the optimal regression algorithm from among the plurality of regression algorithms and a corresponding set of hyper-parameters for self-learning of the ML regression model.

2. The method of claim 1, further comprising:
extracting the optimal set of meta features from a test data set received from the plurality of sensors; and
obtaining via the trained meta learner a recommended regression algorithm from among the plurality of regression algorithms and a corresponding set of, hyper-parameters that are used to retrain and retune the ML regression model during the self-learning.

3. The method of claim 1, wherein the ML approach selects a predefined number of best meta features from among the plurality of meta features as the optimal set of meta features using a SelectFromModel functionality in accordance with one of a specified threshold, and a mean threshold.

4. The method of claim 1, wherein the DL approach selects a predefined number of best meta features from among the plurality of meta features as the optimal set of meta features using a bottleneck Neural Network architecture.

5. The method of claim 1, wherein the set of hyper-parameters evaluated for each of the plurality of regression algorithms is stored and retrieved from a knowledge base.

6. The method of claim 1, wherein the static reward function in the Q-learning is set statically before start of any episode in Q-learning and a plurality of importance values of the plurality of meta features are obtained using a SelectFromModel function, wherein the plurality of importance values are identified as rewards, which remain constant across episodes.

7. The method of claim 1, wherein the Area Under Curve (AUC) metric of a classifier represents the dynamic reward function for an action in each episode, and the action represents meta feature selection in Q-learning, and wherein steps of selection of each meta feature to obtain the optimal set of meta features comprises:

individually considering each meta feature from among the plurality of meta features and computing the AUC metric for each meta feature;

selecting a meta feature from among the plurality of meta features having the best AUC metric; and rewarding of all the remaining actions associated with next meta features selection in accordance with the selected meta feature.

8. A system comprising:

a memory storing instructions;

one or more Input/Output (I/O) interfaces; and one or more hardware processors coupled to the memory via the one or more I/O interfaces, wherein the one or more hardware processors are configured by the instructions to:

train a meta learner for recommending an optimal regression algorithm from among a plurality of regression algorithms during self-learning of a Machine Learning (ML) regression model of an industrial process, the training comprising:

preprocessing, based on an incremental data preprocessing approach, each data set from among a plurality of data sets corresponding to the ML regression model to generate a plurality of preprocessed datasets, wherein each data set is a combination of meta data representing old data and new data seamlessly received from a plurality of sensors monitoring the industrial process;

extracting a plurality of meta features from each of the plurality of preprocessed data sets, the plurality meta features comprising a) classification meta features, b) regression meta features, and c) domain meta features based on a domain-meta-feature-taxonomy created for a plurality of industrial plants across a plurality of domains;

selecting an optimal set of meta features from among the plurality of meta features by utilizing one of a) a ML or Deep Learning (DL) technique providing static approach for selecting the optimal set of meta features, and b) a Q-learning based technique, utilizing one of (i) a static reward function that remains constant across episodes of Q-learning, and (ii) a dynamic reward function that changes across episodes, wherein a reward for selecting a next meta feature from among the plurality of meta features depends on one or more meta features that have already been selected in the optimal set of meta features, and wherein the selected optimal set maximizes performance of the meta learner measured in terms of an Area Under the Curve (AUC) metric;

evaluating each of the plurality of preprocessed datasets using each of the plurality of regression algorithms in accordance with the optimal set of meta features selected for each data set by a grid search technique to determine an accuracy and a set of hyper-parameters of each of the plurality of regression algorithms, wherein the optimal set of meta features selected for each data set and the accuracy attained by each of the plurality of regression algorithms form a learner dataset; and training the meta learner using the learner dataset to provide an output comprising the optimal regression algorithm from among the plurality of regression algorithms and a corresponding set of hyper-parameters for self-learning of the ML regression model.

9. The system of claim 8, wherein the one or more hardware processors are further configured to:

extract the optimal set of meta features from a test data set received from the plurality of sensors; and obtain via the trained meta learner a recommended regression algorithm from among the plurality of regression algorithms and a corresponding set of hyper-parameters, that are used to retrain and retune the ML regression model during the self-learning.

10. The system of claim 8, wherein ML approach selects a predefined number of best meta features from among the plurality of meta features as the optimal set of meta features using a SelectFromModel functionality in accordance with one of a specified threshold, and a mean threshold.

11. The system of claim 8, wherein the DL approach selects a predefined number of best meta features from among the plurality of meta features as the optimal set of meta features using a bottleneck Neural Network architecture.

12. The system of claim 8, wherein the set of hyper-parameters evaluated for each of the plurality of regression algorithms is stored and retrieved from a knowledge base.

13. The system of claim 8, wherein the one or more hardware processors are configured statically set the static reward function in the Q-learning before start of any episode in Q-learning and obtain a plurality of importance values of the plurality of meta features using a SelectFromModel function, wherein the plurality of importance values are identified as rewards, which remain constant across episodes.

14. The system of claim 8, wherein the Area Under Curve (AUC) metric of a classifier represents the dynamic reward function for an action in each episode, and the action represents meta feature selection in Q-learning, and wherein the one or more hardware processors are configured to select each meta feature to obtain the optimal set of meta features by:

individually considering each meta feature from among the plurality of meta features and computing the AUC metric for each meta feature;

selecting a meta feature from among the plurality of meta features having the best AUC metric; and rewarding of all the remaining actions associated with next meta features selection in accordance with the selected meta feature.

15. One or more non-transitory machine-readable information storage mediums comprising one or more instructions which when executed by one or more hardware processors cause:

training a meta learner for recommending an optimal regression algorithm from among a plurality of regression algorithms during self-learning of a Machine Learning (ML) regression model of an industrial process, the training further comprising:

preprocessing, based on an incremental data preprocessing approach, each data set from among a plurality of data sets corresponding to the ML regression model to generate a plurality of preprocessed datasets, wherein each data set is a combination of meta data representing old data and new data seamlessly received from a plurality of sensors monitoring the industrial process;

extracting a plurality of meta features from each of the plurality of preprocessed data sets, the plurality meta features further comprising a) classification meta features, b) regression meta features, and c) domain meta features based on a domain-meta-feature-taxonomy created for a plurality of industrial plants across a plurality of domains;

selecting an optimal set of meta features from among the plurality of meta features by utilizing one of a) a ML or Deep Learning (DL) technique providing static approach for selecting the optimal set of meta features, and b) a Q-learning based technique, utilizing one of (i) a static reward function that remains constant across episodes of Q-learning, and (ii) a dynamic reward function that changes across episodes, wherein a reward for selecting a next meta feature from among the plurality of meta features depends on one or more meta features that have already been selected in the optimal set of meta features, and wherein the selected optimal set maximizes performance of the meta learner measured in terms of an Area Under the Curve (AUC) metric;

evaluating each of the plurality of preprocessed datasets using each of the plurality of regression algorithms in accordance with the optimal set of meta features selected for each data set by a grid search technique to determine an accuracy and a set of hyper-parameters of each of the plurality of regression algorithms, wherein the optimal set of meta features selected for each data set and the accuracy attained by each of the plurality of regression algorithms form a learner dataset; and training the meta learner using the learner dataset to provide an output further comprising the optimal regression algorithm from among the plurality of regression algorithms and a corresponding set of hyper-parameters for self-learning of the ML regression model.

16. The one or more non-transitory machine-readable information storage mediums of claim 15, wherein the one or more instructions which when executed by the one or more hardware processors further cause:

extracting the optimal set of meta features from a test data set received from the plurality of sensors; and obtaining via the trained meta learner a recommended regression algorithm from among the plurality of regression algorithms and a corresponding set of hyper-parameters, that are used to retrain and retune the ML regression model during the self-learning.

17. The one or more non-transitory machine-readable information storage mediums of claim 15, wherein the ML approach selects a predefined number of best meta features from among the plurality of meta features as the optimal set of meta features using a SelectFromModel functionality in accordance with one of a specified threshold, and a mean threshold.

18. The one or more non-transitory machine-readable information storage mediums of claim 15, wherein the DL approach selects a predefined number of best meta features from among the plurality of meta features as the optimal set of meta features using a bottleneck Neural Network architecture.

19. The one or more non-transitory machine-readable information storage mediums of claim 15, wherein the set of hyper-parameters evaluated for each of the plurality of regression algorithms is stored and retrieved from a knowledge base.

20. The one or more non-transitory machine-readable information storage mediums of claim 15, wherein the static reward function in the Q-learning is set statically before start of any episode in Q-learning and a plurality of importance values of the plurality of meta features are obtained using a SelectFromModel function, wherein the plurality of importance values are identified as rewards, which remain constant across episodes.

* * * * *